United States Patent Office 3,537,783
Patented Nov. 3, 1970

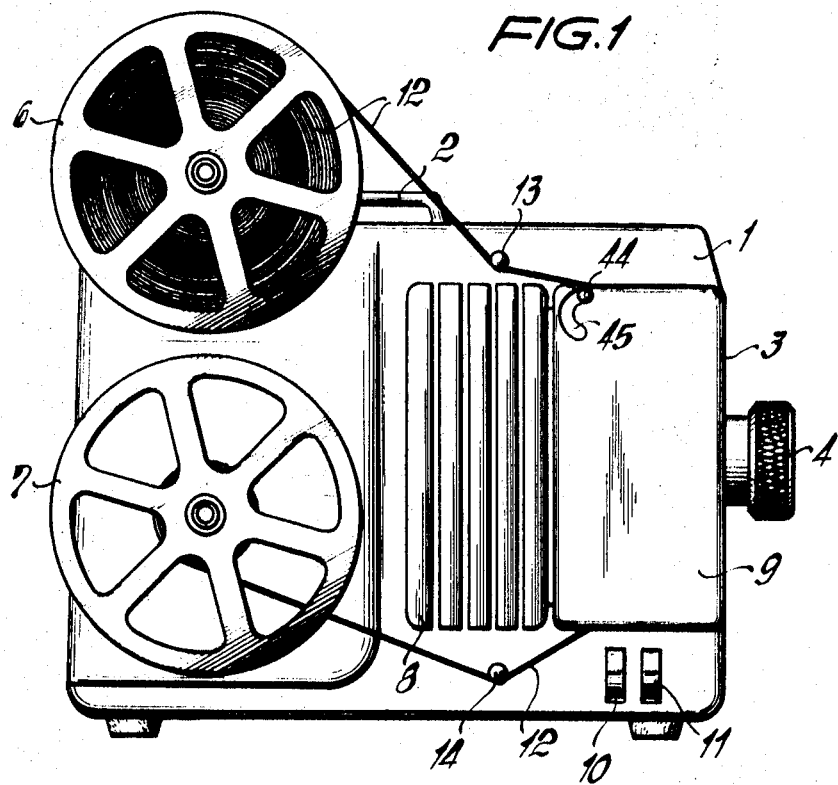
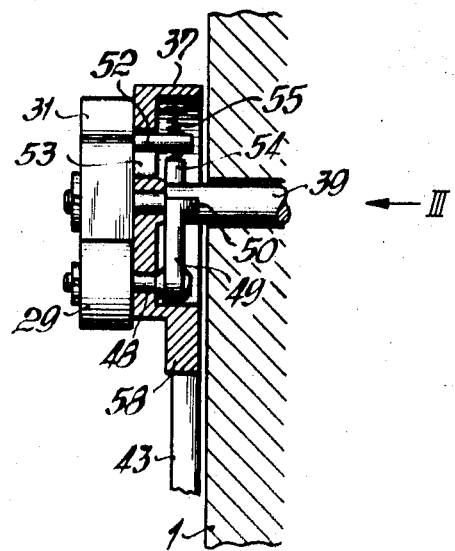

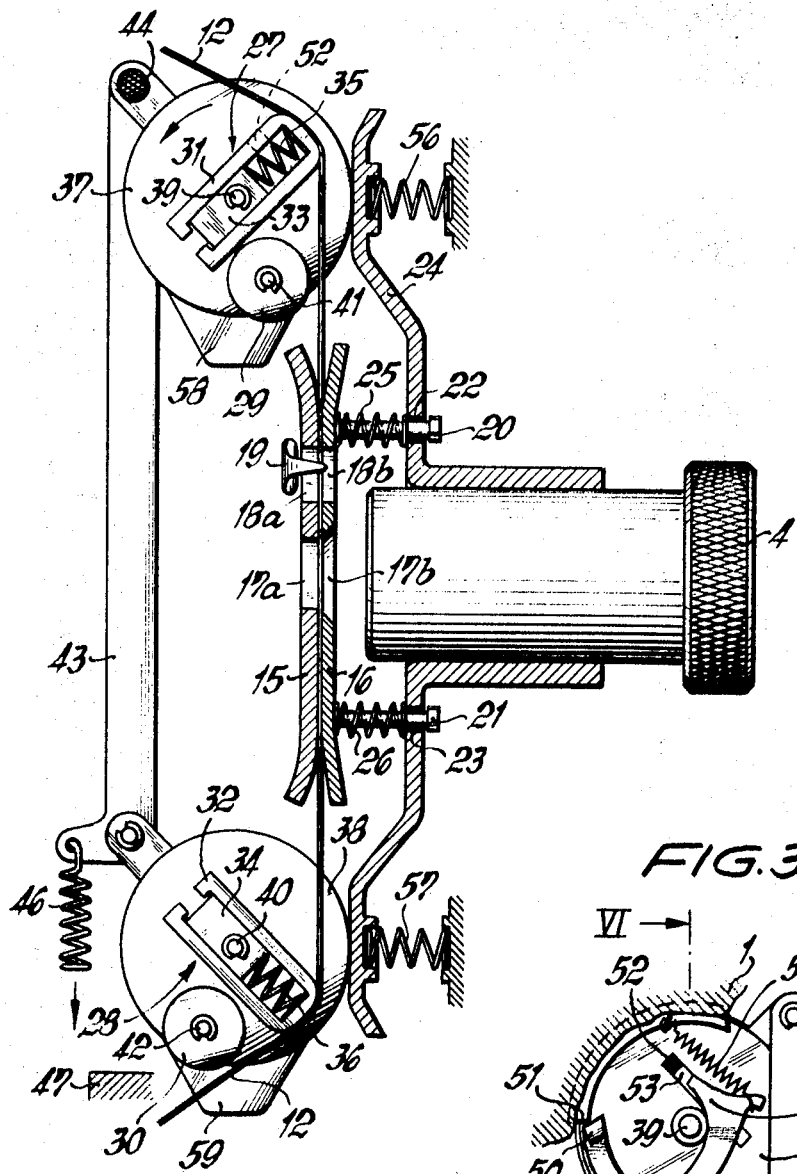
FIG. 2
FIG. 3
INVENTORS
PETER KÖRNER
HERBERT REINSCH
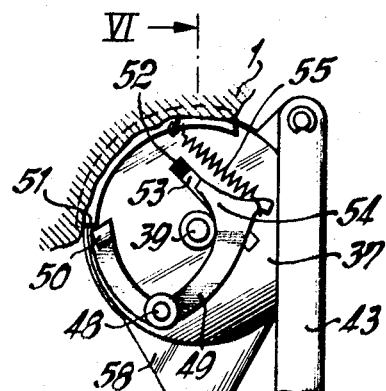
their ATTORNEY

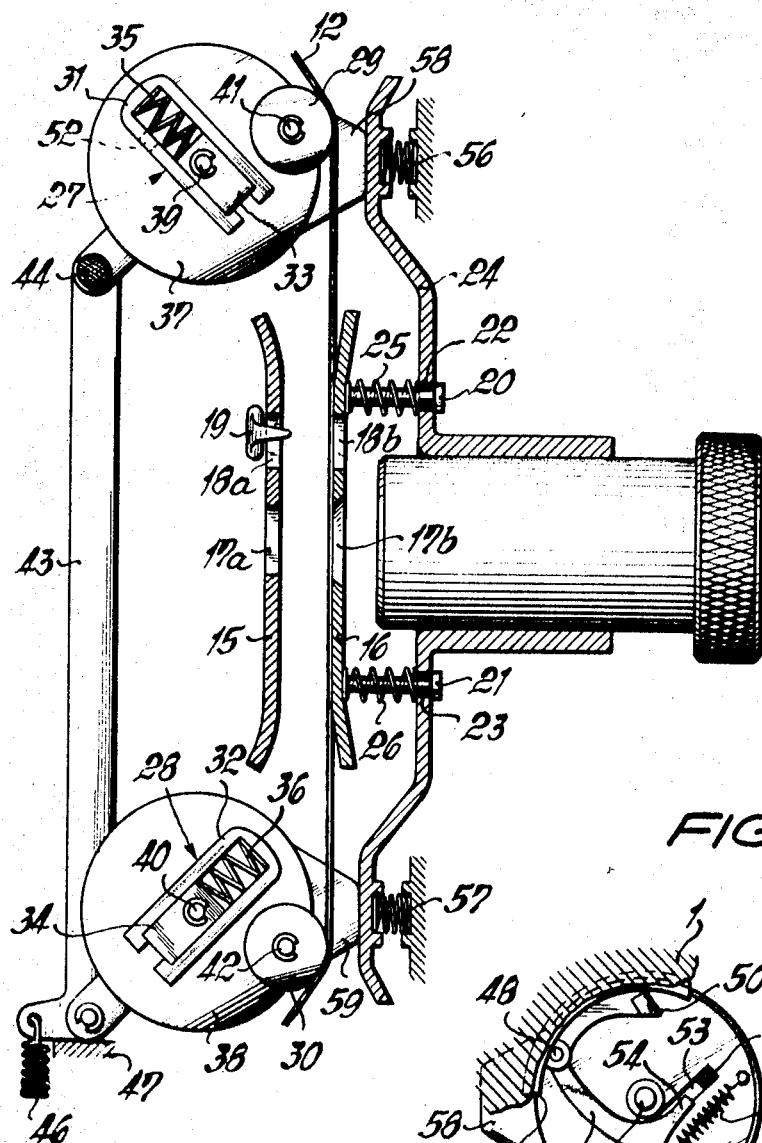
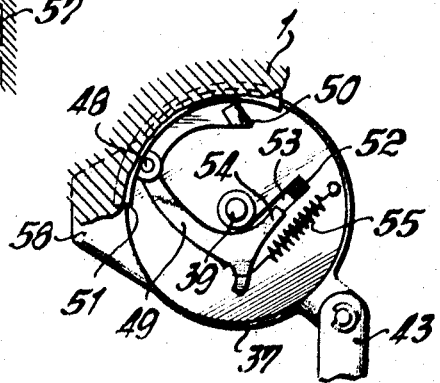

3,537,783
CINEMATOGRAPHIC APPARATUS
Peter Körner, Retchenbach, and Herbert Reinsch, Stuttgart, Germany, assignors to Robert Bosch Elektronik und Photokino GmbH, Stuttgart-Unterturkheim, Germany
Filed Nov. 21, 1968, Ser. No. 777,666
Claims priority, application Germany, Dec. 14, 1967, 1,280,670
Int. Cl. G03b 1/46
U.S. Cl. 352—124                                20 Claims

ABSTRACT OF THE DISCLOSURE

A motion picture projector wherein the film is guided for movement back and forth between a supply reel and a takeup reel and passes through a gate which is flanked by two guide rolls and two yieldable snubbing units. Each guide roll and the corresponding snubbing unit is mounted on a carrier which is turnable between two positions to respectively move the associated guide roll or the associated snubbing unit into deflecting engagement with the film. The guide rolls engage and deflect the film during rewinding onto the supply reel and the snubbing units engage and deflect the film during travel from the supply reel toward the takeup reel. The two carriers are coupled to each other for simultaneous movement and the gate opens and enables the guide rolls to disengage the film from the calw pull-down in response to movement of guide rolls to film deflecting positions.

BACKGROUND OF THE INVENTION

The present invention relates to cinematographic apparatus, and more particularly to improvements in motion picture projectors, especially to improvements in projectors of the type wherein the film is transported back and forth between rotary supply and takeup reels by a mechanism which does not or need not include sprockets. Still more particularly, the invention relates to improvements in motion picture projectors wherein the film is engaged and deflected by guide rolls and by yieldably mounted tensioning devices.

U.S. Pat. No. 2,287,792 to Foster discloses a motion picture projector wherein the film is permanently engaged by resilient tensioning devices which comprise convex snubbing members and wherein the film is additionally engaged by a series of fixedly mounted idler rolls and sprockets. A drawback of such projectors is that the snubbing members produce excessive friction as a result of continuous engagement with the film, particularly when the film is being rapidly rewound onto the supply reel. This causes excessive wear upon and excessive heating of the film.

German Pat. No. 892,711 discloses a projector wherein the film is engaged by a spring-biased roller which is assembled with a damping device. Such construction does not cause excessive overheating of and/or excessive wear upon the film; however, the inertia of the damping device is excessive so that it is not sufficiently sensitive and cannot immediately react to changes in tension of motion picture film. It was found that a projector employing the structure of this German patent cannot insure satisfactory positioning of film frames, especially at high frequencies, because the inertia of the damping device is too high so that it cannot vibrate in synchronism with movements of the claw pull-down.

SUMMARY OF THE INVENTION

One of several objects of our invention is to provide a structure, particularly a structure which can be embodied in a motion picture projector of the type wherein the film is transported without resorting to sprockets, which overcomes the drawbacks of the aforediscussed patented structures, which insures proper positioning of each film frame during the projection of images, and which can guide and otherwise influence the film without causing excessive wear and/or overheating.

Another object of the invention is to provide a motion picture projector wherein the film which travels back and forth between a supply device and a takeup device is guided, tensioned and advanced in a novel and improved way.

A further object of the invention is to provide a novel mounting for snubbing units and guide means which engage the film between the supply and takeup reels of a cinematographic apparatus.

An additional object of the invention is to provide a novel operative connection between a film gate and the film guiding and snubbing means in a motion picture projector of the above outlined character.

Still another object of the invention is to provide an automatic or semiautomatic displacing system for the film guiding and snubbing means in a motion picture projector.

The invention is embodied in a structure which can be incorporated in a motion picture projector, particularly in a projector wherein the film moving along a predetermined path between the supply and takeup devices is transported without resorting to sprockets. It comprises a gate which defines a section of the film path, a pair of guide means each adjacent to one end of the section, a pair of yieldable snubbing or tensioning means each adjacent to one end of the section, and displacing means for moving the guide means and the snubbing means between operative positions in which they engage and deflect the film at the respective end of the section of the film path and inoperative positions in which they are disengaged from the film in such a way that the guide means are in operative positions when the snubbing means are held in inoperative positions and vice versa. Thus, the guide means (which preferably comprise idler rolls) can engage the film during rapid transport back to the supply device and the snubbing means can engage the film during intermittent transport past the gate for the purpose of projecting the images of successive frames onto a screen or the like. The novel structure preferably further comprises a pair of pivotable disks or analogous carrier means each of which supports one of the guide means and the adjoining snubbing means. The carrier means are movable between two spaced positions in which they respectively maintain the corresponding guide means and the corresponding snubbing means in operative positions, and such movement of the carrier means to at least one of their positions can be effected automatically, for example, in response to a change in the condition of the film which is being transported between the supply and takeup devices. In accordance with a presently preferred embodiment of our invention, a change in the tension of film which develops when the film is fully collected by one of the two devices is utilized to effect automatic change in the positions of carrier means. Such change in tension develops when the claw pull-down continues to pull the film in a direction away from the supply device when the latter has paid out the film so that only the trailing end of the film remains attached thereto. The means for detecting such change in the tension of film may form part of one of the snubbing means.

The novel features which are considered as characteristic of the invention are set forth in particular in the appended claims. The improved cinematographic apparatus itself, however, both as to its construction and its mode of operation, together with additional features and

3 advantages thereof, will be best understood upon perusal of the following detailed description of certain specific embodiments with reference to the accompanying drawing.

BRIEF DESCRIPTION OF THE DRAWING

FIG. 1 is a schematic side elevational view of a motion picture projector which embodies the invention;

FIG. 2 is an enlarged fragmentary longitudinal vertical sectional view of the projector, the snubbing means of the projector being shown in operative positions;

FIG. 3 is a rear elevational view of a carrier means for one of the snubbing means as seen in the direction of arrow III in FIG. 6;

FIG. 4 is a sectional view similar to that of FIG. 2 but showing the snubbing means in inoperative positions;

FIG. 5 illustrates the structure of FIG. 3 but with the parts shown in different positions corresponding to inoperative positions of the snubbing means; and FIG. 6 is a sectional view as seen in the direction of arrows from the line VI—VI of FIG. 3.

DESCRIPTION OF THE PREFERRED EMBODIMENTS

FIG. 1 illustrates a motion picture projector which comprises a housing 1 provided with a handle 2. The front wall 3 of the housing 1 carries a projection lens 4. The housing 1 further supports a rotary supply reel 6 and a rotary takeup reel 7. The projection lamp (not shown) is accommodated in a lamp casing 8 which is formed with a hingedly connected cover or door 9. The actuating means of the projector comprises a pair of knobs 10, 11 which can turn on and off the projection lamp and can start and arrest the motor, not shown.

A tape of motion picture film 12 is guided along a path which extends from the core of the supply reel 6, along a guide roller 13, through a film gate which is concealed by the cover 9, along a further guide roller 14, and on to the core of the takeup reel 7.

The gate which defines an elongated section of the film path is shown in FIG. 2. It comprises a first apertured plate 15 which is affixed to the housing 1 and a second apertured plate or pressure plate 16 which is reciprocable in the direction of the optical axis and is biased by springs 25, 26 in a direction toward the fixed first plate 15. Means (to be described later) is provided to move the pressure plate 16 to open position away from the first plate 15 when the film 12 is to be rewound onto the core of the supply reel 6. The plates 15, 16 are respectively provided with registering windows or apertures 17a, 17b for projection of images of successive film frames and with registering slots 18a, 18b for the claw 19 of a conventional pull-down which enters the perforations of film 12 and transports it stepwise past the windows 17a, 17b. The pull-down is driven by the aforementioned motor which is controlled by the knobs 10, 11.

The pressure plate 16 is provided with two forwardly extending posts 20, 21 which are respectively surrounded by the springs 25, 26 and are reciprocably guided in holes 22, 23 machined into an internal partition or wall 24 of the housing 1. The axes of the posts 20, 21 are parallel to the optical axis. The springs 25, 26 bear against the pressure plate 16 and react against the partition 24. The latter forms part of the aforementioned means for moving the pressure plate 16 to open position.

In accordance with a feature of the present invention, the projector comprises two yieldable film tensioning or snubbing units 27, 28 which are respectively located upstream and downstream of the gap between the plates 15, 16 of the film gate. These snubbing units are respectively associated with guide means 29, 30 (here shown as idler rolls) in such a way that the guide rolls 29, 30 are in deflecting engagement with the film 12 when the latter is not engaged by the snubbing units 27, 28 and vice versa. In other words, the snubbing units 27, 28 are held in

4 operative positions when the guide rolls 29, 30 are moved away from operative positions and vice versa. In their operative positions, the snubbing units 27, 28 and the guide rolls 29, 30 are adjacent to the aforementioned film path. When the film 12 is being moved forwardly, namely, from the supply reel 6 toward the takeup reel 7, it is engaged and deflected by the snubbing units 27, 28; the guide rolls 29, 30 are moved to operative positions when the operator desires to rapidly rewind the film 12 by moving it from the core of the reel 7 back onto the core of the reel 6.

In the illustrated embodiment, the snubbing units 27, 28 respectively comprise relatively small substantially U-shaped frames 31, 32 which are reciprocable along blocks 33, 34 and are biased by helical springs 35, 36 in a direction toward the adjoining portion of the film path. The springs 35, 36 can yield in response to increasing tension of film 12 whereby the corresponding frames 31, 32 move along the respective blocks 33, 34 to stress the springs. These springs are rather weak but still strong enough to normally hold the respective frames 31, 32 in the illustrated extended positions.

The snubbing units 27, 28 are respectively mounted on turnable carriers 37, 38 which also support the corresponding guide rolls 29, 30. These carriers resemble disks or drums which are respectively turnable on parallel shafts 39, 40 provided therefor in the housing 1. The frames 31, 32 are reciprocable radially of the shafts 39, 40. The shafts 41, 42 of the guide rolls 29, 30 are parallel to the shafts 39, 40, i.e., the guide rolls are eccentrically mounted on the carriers 37, 38.

The carriers 37, 38 are articulately coupled to a connecting member or link 43 so that they can be turned as a unit. This link constitutes a moving means in a displacing means which can move the carriers 37, 38 between two spaced positions respectively corresponding to operative and inoperative positions of the guide rolls 29, 30. The pin which couples the link 43 to a radial arm of the carrier 37 is provided with a handgrip portion 44 which extends through an arcuate slot 45 in the cover 9 (see FIG. 1) so that the carriers 37, 38 can be turned by hand to one of their positions. The lower end of the link 43 (as viewed in FIG. 2) is provided with a lug which is attached to one end of a biasing means 46 here shown as a helical spring 46 tending to turn the carriers 37, 38 in a counterclockwise direction so as to disengage the frames 31, 32 from the film 12 and to move the guide rolls 29, 30 to operative positions. The lower end of the spring 46 is attached to the housing 1 and this spring tends to maintain the connecting link 43 in abutment with a fixed stop 47 which arrests the carriers in one of their positions. In such position of the link 43, the projector is ready for rewinding of film 12 onto the core of the supply reel 6, i.e., theg uide rolls 29, 30 then assume their operative positions.

As shown in FIGS. 3, 5 and 6, the carrier 37 is hollow (it resembles a cup whose open side is adjacent to the adjoining surface of the housing 1) and its bottom panel or base carries an eccentric pin or stud 48 for a latch or pawl 49 which forms part of a locking means serving to hold the carriers 37, 38 in the angular positions shown in FIG. 2 when the apparatus is used to project successive images of the film 12 into a screen, not shown. Thus, the latch or pawl 49 then opposes the bias of the aforementioned spring 46. To this end, the pawl 49 is provided with a pallet or tank 50 which cooperates with a locking projection 51 of the housing 1. In order to disengage the locking means including the pawl 49, its pallet 50 and the projection 51, the apparatus comprises a releasing or disengaging pin 52 which is provided on or forms part of the frame 31 of the snubbing unit 27 and extends through a slot 53 in the carrier 37. An arm 54 on the pawl 49 extends into the path of movement of the releasing pin 52 which latter shares reciprocatory movements of the frame 31 under and against the bias of the spring 35. A helical spring 55 biases the pawl 49 to the locking position shown in FIG. 3. When the projection of images is completed, tension of the film 12 increases automatically and such tension suffices to shift the frame 31 along the block 33 of the snubbing unit 27 so that the spring 35 stores energy and the pin 52 moves substnatially to the left, as viewed in FIG. 2, whereby thepin 52 turns the pawl 49 against the opposition of the spring 55. This causes the pawl 49 to disengage its pallet 50 from the projection 51 whereby the spring 46 contracts and moves the link 43 into abutment with the stop 47.

The aforementioned partition 24 in the housing 1 surrounds the projection lens 4 and is biased by two helical springs 56, 57. These springs serve to urge the partition 24 against the peripheral surfaces of the carriers 37, 38 when the snubbing units 27, 28 assume their operative positions shown in FIG. 2. The springs 56, 57 react against the inner side of the front wall 3 or against another stationary part of or in the housing 1. The carriers 37, 38 are respectively provided with cams 58, 59 which engage the adjoining surface of the partition 24 when the spring 46 is free to contract (i.e., when the link 43 abuts against the stop 47 as shown in FIG. 4) and causes the springs 56, 57 to store energy. The partition 24 entrains the heads of the aforementioned posts 20, 21 and moves the pressure plate 16 to open position, i.e., away from the first plate 15 of the film gate. Thus, the plates 15, 16 then permit unobstructed rewinding of film 12 onto the core of the supply reel 6.

The operation is as follows:

When the motor of the projector is operated in forward direction, the takeup reel 7 is driven in a clockwise direction, as viewed in FIG. 1 (by way of a customary slip clutch, not shown) and the claw 19 of the pull-down transports the film stepwise past the windows 17a, 17b. The pressure plate 16 is held in the film-engaging or closed position of FIG. 2 and the frames 31, 32 of the snubbing units 27, 28 are held in operative positions in which they yieldably engage and deflect the film 12 upstream and downstream of the gate. The guide rolls 29, 30 are held in their inoperative positions and the pallet 50 of the latch or pawl 49 engages the projection 51 of the housing 1 (FIG. 3) so that the link 43 is spaced from the stop 47. The spring 46 stores energy.

The trailing end of the film 12 is connected to the core of the supply reel 6. Thus, when the supply of film on the core of the reel 6 is exhausted but the claw 19 of the pull-down still tends to advance the film lengthwise in a downward direction, as viewed in FIG. 2, tension of the film 12 increases so that the relatively weak spring 35 yields and permits the frame 31 to slide along the block 33 until the releasing pin 52 engages the arm 54 and pivots the pawl 49 in a direction to disengage the pallet 50 from the projection 51 against the opposition of the spring 55. This is shown in FIG. 5; the spring 46 then contracts and moves the link 43 into abutment with the stop 47. Consequently, the snubbing units 27, 28 are moved to inoperative positions and the guide rolls 29, 30 simultaneously assume their operative positions shown in FIG. 4. Moreover, and as the carriers 37, 38 turn under the action of the spring 46, their cams 58, 59 shift the partition 24 against the opposition of springs 56, 57 and cause the posts 20, 21 to move the pressure plate 16 away from the plate 15, i.e., the film gate is open and the film can be readily rewound onto the core of the supply reel 6 as soon as the direction of operation of the motor is reversed.

As the guide rolls 29, 30 move toward their operative positions, they cause the tensioned portion of the film 12 (such portion is tensioned by the claw 19 of the pull-down) to move forwardly, i.e., toward the projection lens 4. Thus, the film follows the movement of the pressure plate 16 with the partition 24 and is thereby automatically disengaged from the claw 19. The operator then depresses the knob 11 to start the motor in reverse so that the supply reel 6 is rotated in a counterclockwise direction, as viewed in FIG. 1, and its core collects teh film 12. Such film travels along the roller 14, guide roll 30, pressure plate 16, guide roll 29, roller 13 and toward the core of the reel 6. The handgrip portion 44 is then manipulated by hand to expand the spring 46 and to return the carriers 37, 38 to the positions shown in FIG. 2. The projector is ready for the next operation in forward direction.

It is clear that the handgrip portion 44 can be omitted (or that this handgrip portion need not be manipulated by hand) if the projector is provided with means for resetting the carriers 37, 38 to the positions shown in FIG. 2 in automatic response to tensioning of film 12 when the latter is fully collected by the core of the supply reel 6. Also, such tensioning of film 12 could cause automatic actuation of a switch which reverses the direction of operation of the motor so that the latter then starts to operate in forward direction and transports the film from the supply reel 6 toward the takeup reel 7. Furthermore, such switch can be actuated by the link 43 and/or by one of the carriers 37, 38 in automatic response to manipulation of the handgrip portion 44 to return the link to the position shown in FIG. 2.

When the handgrip portion 44 is manipulated to return the carriers 37, 38 to the angular positions shown in FIG. 2, the spring 55 causes the pallet 50 of the pawl 49 to reengage the projection 51 of the housing 1 so that the link 43 remains in the position shown in FIG. 2 until after the frame 31 is shifted again in response to tensioning of the film between the claw 19 and the snubbing unit 27 so as to cause the releasing pin 52 to disengage the pawl 49 from the projection 51. Also, and as the operator turns the carriers 37, 38 by way of the handgrip portion 44, the cams 58, 59 move away from engagement with the partition 24 so that the springs 56, 57 expand and return the pressure plate 16 to the closed position shown in FIG. 2. At the same time, the guide rolls 29, 30 are moved to inoperative positions and the snubbing units 27, 28 reassume their operative positions.

A very important advantage of our projector is that, in constructing and assembling the snubbing units 27, 28, the designer of the projector need not consider the optimum conditions for rapid rewinding of film onto the supply reel. This will be readily understood since the snubbing units are disengaged from the film during rewinding. In other words, the snubbing units may be of lightweight construction and can be designed to react to relatively small changes in film tension during transport of the film toward the takeup reel. Moreover, one of the snubbing units may also serve as a means for disengaging the locking means so that the position of the carriers 37, 38 can be changed automatically in response to a change in the tension of film to insure that the guide rolls 29, 30 are moved to operative positions prior to rewinding of film onto the core of the supply reel 6.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims:

1. In a cinematographic apparatus wherein a tape of motion picture film is transported along a predetermined path in a first direction from a supply device to a takeup device and in the opposite direction, a combination comprising a gate defining a section of said path; a pair of guide means, one adjacent to each end of said section; a pair of yieldable snubbing means, one adjacent to each end of said section, said guide means and said snubbing means being movable between operative positions of deflecting engagement with and inoperative positions of disengagement from the tape which is transported along said path; and displacing means for moving said guide means and said snubbing means so that said guide means engage the tape in inoperative positions of said snubbing means and vice versa.

2. A combination as defined in claim 1, wherein each of said guide means comprises an idler roll and further comprising housing means supporting said gate, said idler rolls, said snubbing means and said displacing means.

3. A combination as defined in claim 1, wherein said displacing means is arranged to maintain said guide means in operative positions while the tape travels from said takeup device toward said supply device.

4. A combination as defined in claim 1, wherein said displacing means comprises a pair of movable carrier means each of which supports one of said guide means and the adjoining snubbing means.

5. A combination as defined in claim 4, wherein said displacing means further comprises moving means for moving said carrier means simultaneously between first and second positions in the first of which said guide means assume their operative positions and in the second of which said snubbing means assume their operative positions.

6. A combination as defined in claim 5, wherein said carrier means are turnable between said positions thereof.

7. A combination as defined in claim 5, further comprising locking means for releasably holding of said carrier means in one of said positions thereof.

8. A combination as defined in claim 7, wherein said displacing means further comprises biasing means for urging said carrier means to the other positions thereof.

9. A combination as defined in claim 8, wherein said one position of each of carrier means is said first position thereof.

10. A combination as defined in claim 8, further comprising stop means for arresting said carrier means in said other positions thereof.

11. A combination as defined in claim 7, wherein the condition of the tape changes when its travel from the one to the other of said devices is terminated and further comprising releasing means for disengaging said locking means in response to such change in the condition of the tape.

12. A combination as defined in claim 11, wherein said releasing means forms part of one of said snubbing means.

13. A combination as defined in claim 11, wherein said change is a change in the tension of said tape.

14. A combination as defined in claim 13, wherein at least one of said carrier means is turnable between said positions thereof and wherein said locking means comprises a fixed projection and a spring-biased latch provided on said one carrier means and engaging said projection in the one position of said one carrier means, said portion of said one snubbing means being arranged to disengage said latch from said projection in response to said change in tension of the tape.

15. A combination as defined in claim 14, wherein said latch is a pawl which is pivotably mounted on said one carrier means and wherein said pawl comprises an arm which is engaged by said portion of said one snubbing means when the latter yields to a predetermined extent in response to tensioning of the tape.

16. A combination as defined in claim 1, wherein at least a portion of said gate is movable between an open and a closed position and further comprising means for moving said portion of said gate to open position to thereby widen said section of said path in response to movement of said guide means to operative positions.

17. A combination as defined in claim 16, wherein said gate comprises a first apertured plate and said portion of the gate comprises a second apertured plate which is biased against said first plate and is moved away from said first plate in said open position thereof.

18. A combination as defined in claim 1, wherein the tape is motion picture film which is provided with a row of perforations, and further comprising film transporting means including claw means arranged to enter said perforations and to transport the film in the region of said gate, said gate comprising a portion movable from a closed to an open position in a direction away from said claw means, and means for moving said portion of the gate to open position in response to movement of said guide means to operative positions, said guide means being arranged to move the film away from said claw ment of said guide means to operative positions.

19. A combination as defined in claim 18, wherein said displacing means comprises a pair of carrier means each supporting one of said guide means and the adjoining snubbing means and moving means for moving said carrier means between two spaced positions to thereby move the corresponding guide means and snubbing means between operative and inoperative positions, said means for moving said portion of the gate comprising cam means movable with said carrier means.

20. A combination as defined in claim 1, wherein said displacing means comprises a pair of carrier means each supportingly connected with one of said guide means and the adjoining snubbing means and each movable between a pair of spaced positions respectively corresponding to operative positions of the associated guide means and carrier means for simultaneous movement between said positions thereof.

References Cited

UNITED STATES PATENTS

| | | |
|---|---|---|
| 2,560,254 | 7/1951 | Shickel. |
| 3,311,280 | 3/1967 | Larson et al. _____ 226—195 |

LOUIS R. PRINCE, Primary Examiner

T. W. ROSKOS, Assistant Examiner

U.S. Cl. X.R.

226—195, 199; 242—75.2, 205; 352—166